US009527005B2

(12) United States Patent
Dighe (10) Patent No.: US 9,527,005 B2
(45) Date of Patent: *Dec. 27, 2016

(54) SYSTEM AND METHOD FOR WATER TREATMENT

(75) Inventor: Shyam V. Dighe, North Huntingdon, PA (US)

(73) Assignee: Aquasource Technologies Corporation, North Huntingdon, PA (US)

( * ) Notice: Subject to any disclaimer, the term of this patent is extended or adjusted under 35 U.S.C. 154(b) by 806 days.

This patent is subject to a terminal disclaimer.

(21) Appl. No.: 13/613,478

(22) Filed: Sep. 13, 2012

(65) Prior Publication Data

US 2013/0062191 A1 Mar. 14, 2013

Related U.S. Application Data (60) Provisional application No. 61/573,900, filed on Sep. 14, 2011, provisional application No. 61/573,957, (Continued)

(51) Int. Cl.
*C02F 1/04* (2006.01)
*B01D 1/26* (2006.01)
(Continued)

(52) U.S. Cl.
CPC .............. *B01D 1/26* (2013.01); *B01D 1/0058* (2013.01); *B01D 1/16* (2013.01); *B01D 1/305* (2013.01);
(Continued)

(58) Field of Classification Search
CPC .............. C02F 1/04; C02F 1/048; C02F 1/06; C02F 2001/5218; B01D 1/26; B01D 3/06; B01D 3/065
See application file for complete search history.

(56) References Cited

U.S. PATENT DOCUMENTS 2,441,361 A 5/1948 Kirgan
3,119,752 A 1/1964 Checkovich
(Continued)

FOREIGN PATENT DOCUMENTS

EP 1 770 068 4/2007
EP 1 775 265 4/2007
(Continued)

OTHER PUBLICATIONS

Notification of Transmittal of the International Search Report and the Written Opinion of the International Searching Authority, International Search Report and Written Opinion of the International Searching Authority for PCT/US2012/055175, dated Jan. 9, 2013 (12 pages).
(Continued)

*Primary Examiner* — In Suk Bullock
*Assistant Examiner* — Jonathan Miller
(74) *Attorney, Agent, or Firm* — Buchanan Ingersoll & Rooney PC (57) ABSTRACT

System and method of treating waste water includes: receiving waste water at a first pressure and temperature, the waste water comprising dissolved solids and VOCs; pressurizing, by a pump, the received waste water to a second pressure greater than the first pressure; preheating, by a preheater, the waste water to a second temperature greater than the first temperature producing distilled water; heating, by a condenser, the waste water to a third temperature greater than the second temperature; heating the pressurized/heated water with a heater operated with a hot gas developed by a plasma torch to a fourth temperature greater than the third temperature; and removing dissolved solids from the waste water by evaporation to produce steam and brine water, wherein the brine water has a total dissolved solids content
(Continued)

greater than a total dissolved solids content of the received waste water. The brine water is crystallized to a solid mass.

19 Claims, 4 Drawing Sheets

Related U.S. Application Data filed on Sep. 14, 2011, provisional application No. 61/573,958, filed on Sep. 14, 2011, provisional application No. 61/573,956, filed on Sep. 14, 2011, provisional application No. 61/573,955, filed on Sep. 14, 2011, provisional application No. 61/573,954, filed on Sep. 14, 2011, provisional application No. 61/573,953, filed on Sep. 14, 2011, provisional application No. 61/573,952, filed on Sep. 14, 2011.

(51) Int. Cl.
*C02F 1/06* (2006.01)
*B01D 1/16* (2006.01)
*B01D 1/30* (2006.01)
*B01D 3/06* (2006.01)
*B01D 5/00* (2006.01)
*B01D 1/00* (2006.01)
*C02F 1/16* (2006.01)
*C02F 1/52* (2006.01)
*C02F 103/10* (2006.01)

(52) U.S. Cl.
CPC ............. *B01D 3/06* (2013.01); *B01D 3/065* (2013.01); *B01D 5/0039* (2013.01); *C02F 1/048* (2013.01); *C02F 1/06* (2013.01); *C02F 1/16* (2013.01); *C02F 2001/5218* (2013.01); *C02F 2103/10* (2013.01); *C02F 2209/02* (2013.01); *C02F 2209/03* (2013.01); *C02F 2301/063* (2013.01)

(56) References Cited

U.S. PATENT DOCUMENTS

| | | |
|---|---|---|
| 3,186,924 A | 6/1965 | Williamson |
| 3,197,387 A | 7/1965 | Lawrance |
| 3,203,464 A | 8/1965 | Kingma |
| 3,213,000 A | 10/1965 | Ewing |
| 3,216,910 A | 11/1965 | Langer et al. |
| 3,285,832 A | 11/1966 | Sephton |
| 3,337,419 A | 8/1967 | Kogan |
| 3,342,697 A | 9/1967 | Hammond |
| 3,360,442 A | 12/1967 | Starmer |
| 3,396,086 A | 8/1968 | Starmer |
| 3,433,717 A | 3/1969 | Loebel |
| 3,434,522 A | 3/1969 | Laurenty |
| 3,442,765 A | 5/1969 | Levite |
| 3,487,873 A | 1/1970 | Bromley et al. |
| 3,488,260 A | 1/1970 | Gilbert |
| 3,488,686 A | 1/1970 | Dunwoody et al. |
| 3,586,090 A | 6/1971 | Henderson |
| 3,607,135 A | 9/1971 | Gereth et al. |
| 3,627,646 A | 12/1971 | Osdor |
| 3,634,199 A | 1/1972 | Van Winkle |
| 3,664,145 A | 5/1972 | Johnson |
| 3,690,116 A | 9/1972 | Cheng et al. |
| 3,734,160 A | 5/1973 | Osdor |
| 3,763,014 A | 10/1973 | Barba et al. |
| 3,844,899 A | 10/1974 | Sager, Jr. |
| 3,855,072 A | 12/1974 | Liu |
| 3,884,767 A | 5/1975 | Pottharst, Jr. |
| 3,912,578 A | 10/1975 | Didycz et al. |
| 3,926,739 A | 12/1975 | Izumi |
| 3,933,597 A | 1/1976 | Barba et al. |
| 3,946,495 A | 3/1976 | Osdor |
| 3,951,753 A | 4/1976 | Roller |
| 3,970,820 A | 7/1976 | Mahl |
| 4,010,018 A | 3/1977 | Kantor |
| 4,017,421 A | 4/1977 | Othmer |
| 4,035,243 A | 7/1977 | Katz et al. |
| 4,043,130 A | 8/1977 | Brown et al. |
| 4,055,145 A | 10/1977 | Mager et al. |
| 4,078,976 A | 3/1978 | Spears, Jr. |
| 4,083,781 A | 4/1978 | Conger |
| 4,105,505 A | 8/1978 | Saari |
| 4,136,530 A | 1/1979 | Kantor |
| 4,141,825 A | 2/1979 | Conger |
| 4,162,945 A | 7/1979 | Hofstede et al. |
| 4,186,058 A | 1/1980 | Katz et al. |
| 4,186,060 A | 1/1980 | Katz et al. |
| 4,282,067 A | 8/1981 | Katz et al. |
| 4,287,019 A | 9/1981 | Standiford |
| 4,312,710 A | 1/1982 | Tanaka et al. |
| 4,315,402 A | 2/1982 | Sadhukhan |
| 4,318,780 A | 3/1982 | Bailie |
| 4,319,964 A | 3/1982 | Katz et al. |
| 4,332,642 A | 6/1982 | Cane et al. |
| 4,334,961 A | 6/1982 | Moen et al. |
| 4,346,490 A | 8/1982 | Katz et al. |
| 4,367,639 A | 1/1983 | Kantor |
| 4,390,670 A | 6/1983 | Walinsky |
| 4,414,341 A | 11/1983 | Williams |
| 4,440,601 A | 4/1984 | Katz et al. |
| 4,441,337 A | 4/1984 | Kantor |
| 4,474,142 A | 10/1984 | Bharathan |
| 4,485,223 A | 11/1984 | Walinsky |
| 4,524,587 A | 6/1985 | Kantor |
| 4,547,559 A | 10/1985 | Walinsky |
| 4,591,413 A | 5/1986 | Peterson |
| 4,641,607 A | 2/1987 | Balazs et al. |
| 4,659,475 A | 4/1987 | Liao et al. |
| 4,710,537 A | 12/1987 | Walinsky |
| 4,731,164 A | 3/1988 | Williamsom |
| 4,750,983 A | 6/1988 | Foster et al. |
| 4,795,532 A | 1/1989 | Mizutani et al. |
| 4,941,330 A | 7/1990 | Williamson |
| 5,032,646 A | 7/1991 | Walinsky |
| 5,133,837 A | 7/1992 | Elmore et al. |
| 5,167,838 A | 12/1992 | Wilensky |
| 5,211,724 A * | 5/1993 | Khan et al. ............... 48/197 R |
| 5,232,603 A | 8/1993 | Denzinger et al. |
| 5,453,306 A | 9/1995 | Tatsumi et al. |
| 5,493,630 A | 2/1996 | Mariner et al. |
| 5,495,550 A | 2/1996 | Mariner et al. |
| 5,513,494 A | 5/1996 | Flynn et al. |
| 5,537,507 A | 7/1996 | Mariner et al. |
| 5,622,605 A | 4/1997 | Simpson et al. |
| 5,637,127 A | 6/1997 | McLaughlin et al. |
| 5,658,993 A | 8/1997 | Denzinger et al. |
| 5,671,322 A | 9/1997 | Finicle |
| 5,681,615 A | 10/1997 | Affinito et al. |
| 5,755,855 A | 5/1998 | Baker et al. |
| 5,861,049 A | 1/1999 | Lokhandwala |
| 5,887,117 A | 3/1999 | Desu et al. |
| 5,902,641 A | 5/1999 | Affinito et al. |
| 5,925,223 A | 7/1999 | Simpson et al. |
| 6,187,206 B1 | 2/2001 | Bernier et al. |
| 6,229,956 B1 | 5/2001 | Morris |
| 6,404,982 B1 | 6/2002 | Mariner et al. |
| 6,622,523 B2 | 9/2003 | Ludwig et al. |
| 6,919,000 B2 | 7/2005 | Klausner et al. |
| 7,081,205 B2 | 7/2006 | Gordon et al. |
| 7,189,436 B2 | 3/2007 | Kohler et al. |
| 7,225,620 B2 | 6/2007 | Klausner et al. |
| 7,328,591 B2 | 2/2008 | Holtzapple et al. |
| 7,416,666 B2 | 8/2008 | Gordon |
| 7,455,778 B2 | 11/2008 | Gordon |
| 7,476,323 B2 | 1/2009 | Gordon |
| 7,510,658 B2 | 3/2009 | Gordon |
| 7,678,227 B2 | 3/2010 | Alt |
| 7,708,865 B2 | 5/2010 | Holtzapple et al. |
| 7,828,883 B2 | 11/2010 | Aines et al. |
| 7,850,826 B2 | 12/2010 | Alt |
| 7,922,873 B2 | 4/2011 | St. Germain et al. |

(56) References Cited

U.S. PATENT DOCUMENTS

| | | | |
|---|---|---|---|
| 7,950,250 | B2 | 5/2011 | Holtzapple et al. |
| 7,954,322 | B2 | 6/2011 | Henderson |
| 7,967,955 | B2 * | 6/2011 | Heins .............................. 203/12 |
| 8,097,128 | B1 | 1/2012 | Sherry |
| 2004/0038808 | A1 * | 2/2004 | Hampden-Smith .... B01J 21/818 502/180 |
| 2009/0020481 | A1 | 1/2009 | Bailie et al. |

FOREIGN PATENT DOCUMENTS

| | | |
|---|---|---|
| JP | 55059879 | 5/1980 |
| WO | 0250215 | 6/2002 |
| WO | 2006123258 | 11/2006 |
| WO | 2010133840 | 11/2010 |
| WO | 2012085860 | 6/2012 |
| WO | 2012127250 | 9/2012 |

OTHER PUBLICATIONS

Notification of Transmittal of the International Search Report and the Written Opinion of the International Searching Authority, International Search Report and Written Opinion of the International Searching Authority for PCT/US2012/055187, dated Dec. 17, 2012 (22 pages).

Notification of Transmittal of the International Search Report and the Written Opinion of the International Searching Authority, International Search Report and Written Opinion of the International Searching Authority for PCT/US2012/055191, dated Jan. 15, 2013 (14 pages).

Notification of Transmittal of the International Search Report and the Written Opinion of the International Searching Authority, International Search Report and Written Opinion of the International Searching Authority for PCT/US2012/055194, dated Jan. 22, 2013 (14 pages).

Supplementary European Search Report and Annex to the European Search Report on European Patent Application No. EP 12 83 2155, dated Jun. 25, 2015 (8 pages).

Supplementary European Search Report and Annex to the European Search Report on European Patent Application No. EP 12 83 2522, dated Jul. 20, 2015 (9 pages).

Supplementary European Search Report and Annex to the European Search Report on European Patent Application No. EP 12 83 1074, dated Jul. 14, 2015 (7 pages).

Supplementary European Search Report and Annex to the European Search Report on European Patent Application No. EP 12 83 1350, dated Jul. 14, 2015 (9 pages).

* cited by examiner

SYSTEM AND METHOD FOR WATER TREATMENT

CROSS-REFERENCE TO RELATED APPLICATIONS

This patent application claims the benefit of U.S. Provisional Patent Application Nos. 61/573,900, 61/573,957, 61/573,958, 61/573,956, 61/573,955, 61/573,954, 61/573,953 and 61/573,952, all filed on Sep. 14, 2011, the disclosures of which are hereby incorporated by reference in their entireties.

FIELD OF THE INVENTION

The present invention is generally directed toward the treatment of water and, more particularly, toward the treatment of water containing large amounts of dissolved solids as may result, for example, from use of the water as a fracking fluid used in drilling gas wells. However, the embodiment proposed herein may be used in any situation where impurities to be removed from water exist.

BACKGROUND OF THE INVENTION

Ensuring a supply of potable water has been a frequent concern in many locations. Further concerns arise about the environmental impact of the disposal of contaminated water.

Conventional water treatment techniques for such purposes as, for example, municipal water treatment and/or obtaining potable water from sea water are known and are successful in many instances. However, some current activities show those techniques to have limited cost effectiveness.

For example, mining with water used to fracture rock or shale formations to recover natural gas (e.g., in the shale regions in the United States and western Canada including, but not limited to, Pennsylvania, Maryland, New York, Texas, Oklahoma, West Virginia and Ohio) requires a very large amount of water input and a significant amount of return (flowback) water that contains a great deal of contaminants and impurities. In order for this flowback water to be used in an environmentally responsible manner, it needs to be relatively free of contaminants/impurities. Water used, for example, in natural gas well drilling and production may contain organic materials, volatile and semi-volatile compounds, oils, metals, salts, etc. that have made economical treatment of the water to make it potable or reusable, or even readily and safely disposable, more difficult. It is desirable to remove or reduce the amount of such contaminants/impurities in the water to be re-used, and also to remove or reduce the amount of such contaminants/impurities in water that is disposed of.

The present invention is directed toward overcoming one or more of the above-identified problems.

SUMMARY OF THE INVENTION

The present invention can take numerous forms among which are those in which waste water containing a large amount of solids, including, for example, dissolved salts, is pressurized to allow considerable heat to be applied before the water evaporates, and is then subjected to separation and recovery apparatus to recover relatively clean water for reuse and to separate solids that include the afore-mentioned dissolved salts. In some instances, the concentrated solids may be disposed of as is, e.g., in a landfill. Where that is not acceptable (e.g., for reasons of leaching of contaminants), the concentrated solids may be supplied to a thermal, pyrolytic, reactor (referred to herein as a "crystallizer") for transforming them into a vitrified mass which can be placed anywhere glass is acceptable.

Particular apparatus for systems and processes in accordance with the present invention can be adapted from apparatus that may be presently currently available, but which has not been previously applied in the same manner. As an example, conventional forms of flash evaporation equipment, such as are used for treating sea water, in one or in multiple stages, may be applied herein as separation and recovery apparatus. Likewise, conventional forms of gasification/vitrification reactors, such as are used for municipal solid waste ("MSW") processing including, but not limited to, plasma gasification/vitrification reactors, may be applied for final separation of the contaminants from the water and for initial heating of the waste water.

The present disclosure presents examples of such systems and processes in which, in one or more successive concentration stages, waste water with dissolved solids (e.g., salts) is pressurized (e.g., from 14.7 psia to 150 psia) and heated (e.g., to 358° F.) before flash evaporation of the waste water to a significantly lower flash pressure and temperature (e.g., 25 psia and 239° F.) of the output brine water with more concentrated salts (e.g., higher Total Dissolved Solids—"TDS").

Steam output from the various concentration stages may be, at least in part, supplied to a stripper to remove volatile organic compounds ("VOCs") which are also included in the waste water.

Depending on the nature and levels of TDS, the brine water from the various concentration stages may be utilized, as is, for other uses, e.g., de-icing fluid, etc., with a significant amount of clean water recovered (e.g., as distilled water from heat exchangers of the concentration stages). The brine water may alternatively be treated in a thermal (e.g., plasma) reactor or crystallizer in order to separate the salts and recover water included in the brine water from the concentration stages.

Examples also include supplying saturated steam from the crystallizer directly to the condensers of the concentration stages, and then from each of which it is then applied as a heating fluid or source of a preheater for the waste water. Incoming waste water or brine water to each concentration stage is initially pressurized and heated (e.g., to 230° F.) by, for example, a pump, a preheater, and a condenser by use of the steam from the crystallizer and/or from the flash evaporator of that stage. The waste water is further heated, prior to flash evaporation, by an additional heater device that mixes the waste water with a hot gas. The hot gas heater may be, for example, a plasma torch gas heater or gas heated by a natural gas burner. However, other types of hot gas heaters may be included without departing from the spirit and scope of the present invention.

A method for treating waste water is disclosed, the method including the steps of: (a) receiving waste water at a first pressure and a first temperature, the waste water comprising dissolved solids, volatile organic compounds and other components generally and collectively called impurities; (b) pressurizing the received waste water to a second pressure greater than the first pressure; (c) preheating the pressurized waste water to a second temperature greater than the first temperature, wherein said preheating step produces distilled water and pressurized/preheated waste water without boiling of the waste water across heat transfer surfaces; (d) heating the pressurized/preheated waste water to a third temperature greater than the second temperature to produce pressurized/heated waste water without boiling of the waste water across heat transfer surfaces; (e) further heating the pressurized/heated water with a heater operated with a hot gas developed by a plasma torch or a natural gas burner to a fourth temperature greater than the third temperature to produce a second pressurized/heated waste water without boiling of the waste water across heat transfer surfaces; and (f) removing dissolved solids from the second pressurized/heated waste water by evaporation caused by depressurization of the waste water to produce steam and brine water, wherein the brine water has a total dissolved solids content greater than a total dissolved solids content of the received waste water. The heater used in step (e) may have a plasma power input appropriately adjusted to produce the heating of the pressurized waste water by direct contact of the hot plasma gas and the waste water. In one example, the power input may be approximately 150-226 kW; however, other levels are contemplated.

The first pressure may be approximately 11.8-17.6 psia, and the first temperature may be approximately 48-72° F.

The second pressure may be approximately 120-180 psia, and the fourth temperature may be approximately 286-430° F.

The second temperature may be approximately 71-114° F.

The third temperature may be approximately 184-276° F.

In one form, the steam produced in step (f), when cooled, produces distilled water. Additionally, the steam produced in step (f) may be used as a heat source in at least one of steps (c) and (d).

In another form, steps (a)-(f) comprise a stage, and wherein the method is performed in multiple stages with the brine water output by step (f) in one stage used as the received waste water in step (a) of a next stage. The brine water output in step (f) of each stage has a total dissolved solids content that is higher than that of a previous stage.

In a further form, the method further includes the steps of: (g) crystallizing the brine water to produce a solid mass of waste product and steam. The steam produced by step (g) may be used as a heat source in at least one of steps (c) and (d). A plasma crystallizer using a plasma torch may be used to crystallize the brine water. The solid mass of waste product may include a vitrified glass of the salts in the brine water.

In yet a further form, the method further includes the steps of: (b') prior to step (b), removing the volatile organic compounds from the received waste water, wherein the removed volatile organic compounds are used as a heat source by the plasma torch to crystallize the brine water. The steam produced by step (g) may be used as a heat source in step (b').

A system for treating waste water is also disclosed, the system including: a pump receiving waste water at a first pressure and a first temperature and pressurizing the received waste water to a second pressure greater than the first pressure, the waste water comprising dissolved solids, volatile organic compounds and other components generally and collectively called impurities; a preheater receiving the pressurized waste water from the pump and preheating the pressurized waste water to a second temperature greater than the first temperature to produce distilled water and pressurized/preheated waste water without boiling of the waste water across heat transfer surfaces; a condenser receiving the pressurized/preheated waste water and further heating the pressurized/preheated waste water to a third temperature greater than the second temperature to produce a pressurized/heated waste water without boiling of the waste water across heat transfer surfaces; a heater operated with a hot gas developed by a plasma torch or a natural gas burner receiving the pressurized/heated waste water and further heating the pressurized/heated waste water to a fourth temperature greater than the third temperature to produce a second pressurized/heated waste water without boiling of the waste water across heat transfer surfaces; and an evaporator removing dissolved solids from the second pressurized/heated waste water by evaporation caused by depressurization of the waste water to produce steam and brine water, wherein the brine water has a total dissolved solids content greater than a total dissolved solids content of the received waste water. The evaporator may include a flash evaporator. The heater may have a plasma power input appropriately adjusted to produce the heating of the pressurized waste water by direct contact of the hot plasma gas and the waste water. In one example, the power input may be approximately 150-226 kW; however, other levels are contemplated.

The first pressure may be approximately 11.8-17.6 psia, and the first temperature may be approximately 48-72° F.

The second pressure may be approximately 120-180 psia, and the fourth temperature may be approximately 286-430° F.

The second temperature may be approximately 71-114° F.

The third temperature may be approximately 184-276° F.

In one form, the steam produced by the evaporator may include distilled water. The steam produced by the evaporator may be used as a heat source by at least one of the preheater and the condenser.

In another form, the pump, preheater, condenser, heater and evaporator comprise a stage, and wherein the system comprises multiple stages with the brine water output by one stage used as the received waste water of a next stage. The brine water output by each stage has a total dissolved solids content that is higher than that of a previous stage.

In a further form, the system further includes a crystallizer crystallizing the brine water to produce a solid mass of waste product and steam. The steam produced by the crystallizer may be used as a heat source by at least one of the preheater and condenser. The solid mass of waste product may include a vitrified glass of the salts in the brine water.

In yet a further form, the crystallizer includes a plasma crystallizer and includes a plasma torch for vaporizing the water from the brine water and producing the solid mass of waste product and steam.

In still a further form, the system further includes a stripper initially receiving the waste water and removing volatile organic compounds from the waste water prior to the waste water being pressurized by the pump, wherein the removed volatile organic compounds are used as a heat source by the plasma torch to crystallize the brine water. The steam produced by the crystallizer is used as a heat source by the stripper.

Further explanations and examples of various aspects of the present invention are presented in the following disclosure.

It is an object of the present invention to provide a system and method for the economic and environmental treatment of waste water.

Various other objects, aspects and advantages of the present invention can be obtained from a study of the specification, the drawings, and the appended claims.

BRIEF DESCRIPTION OF THE DRAWINGS

Further possible embodiments are shown in the drawings. The present invention is explained in the following in greater detail as an example, with reference to exemplary embodiments depicted in drawings. In the drawings.

DETAILED DESCRIPTION OF THE INVENTION

Figure 1:
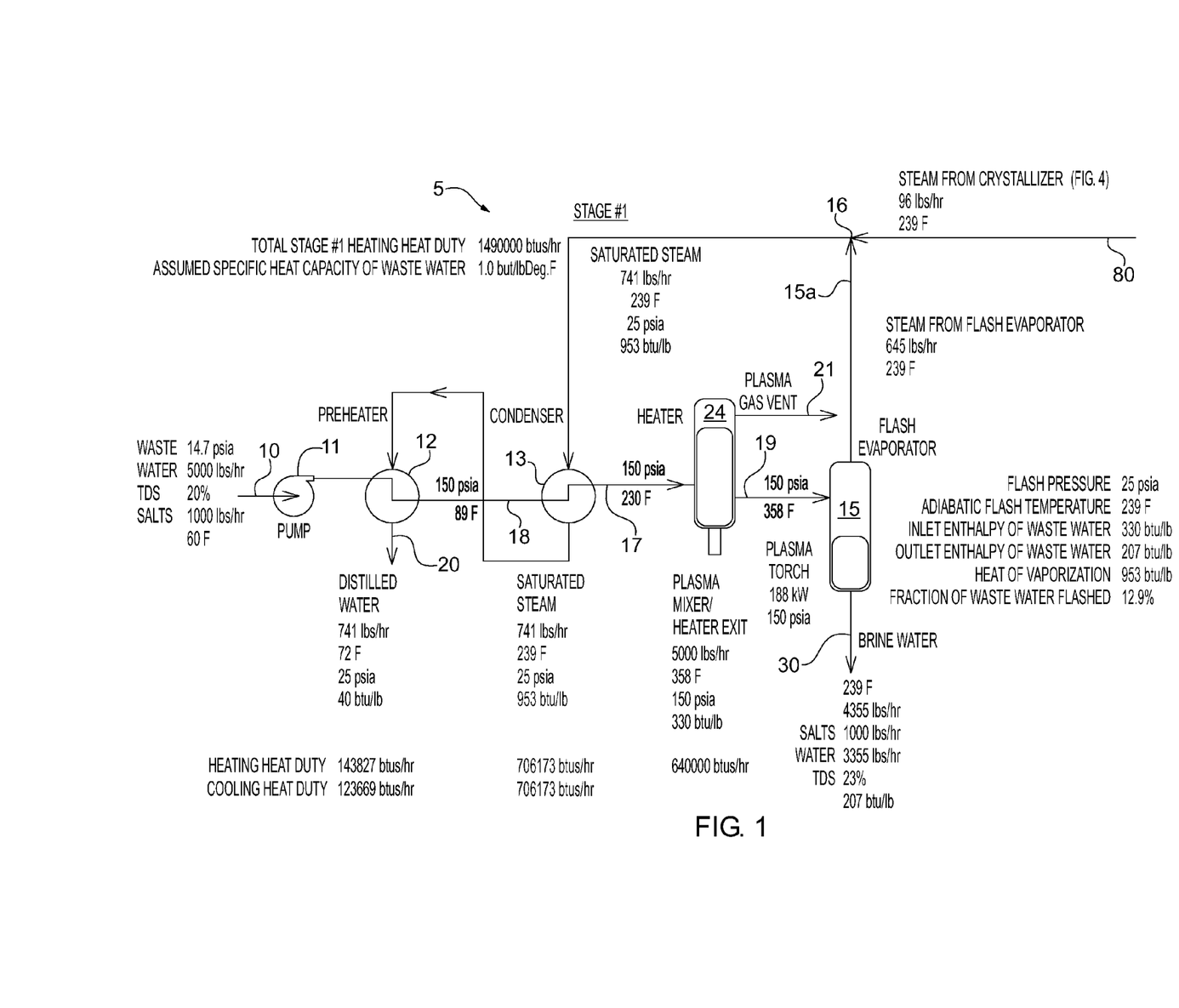
FIGS. 1, 2 and 3 are schematic flow diagrams of particular examples of various stages of a water treatment system in accordance with the present invention.
Figure 2:
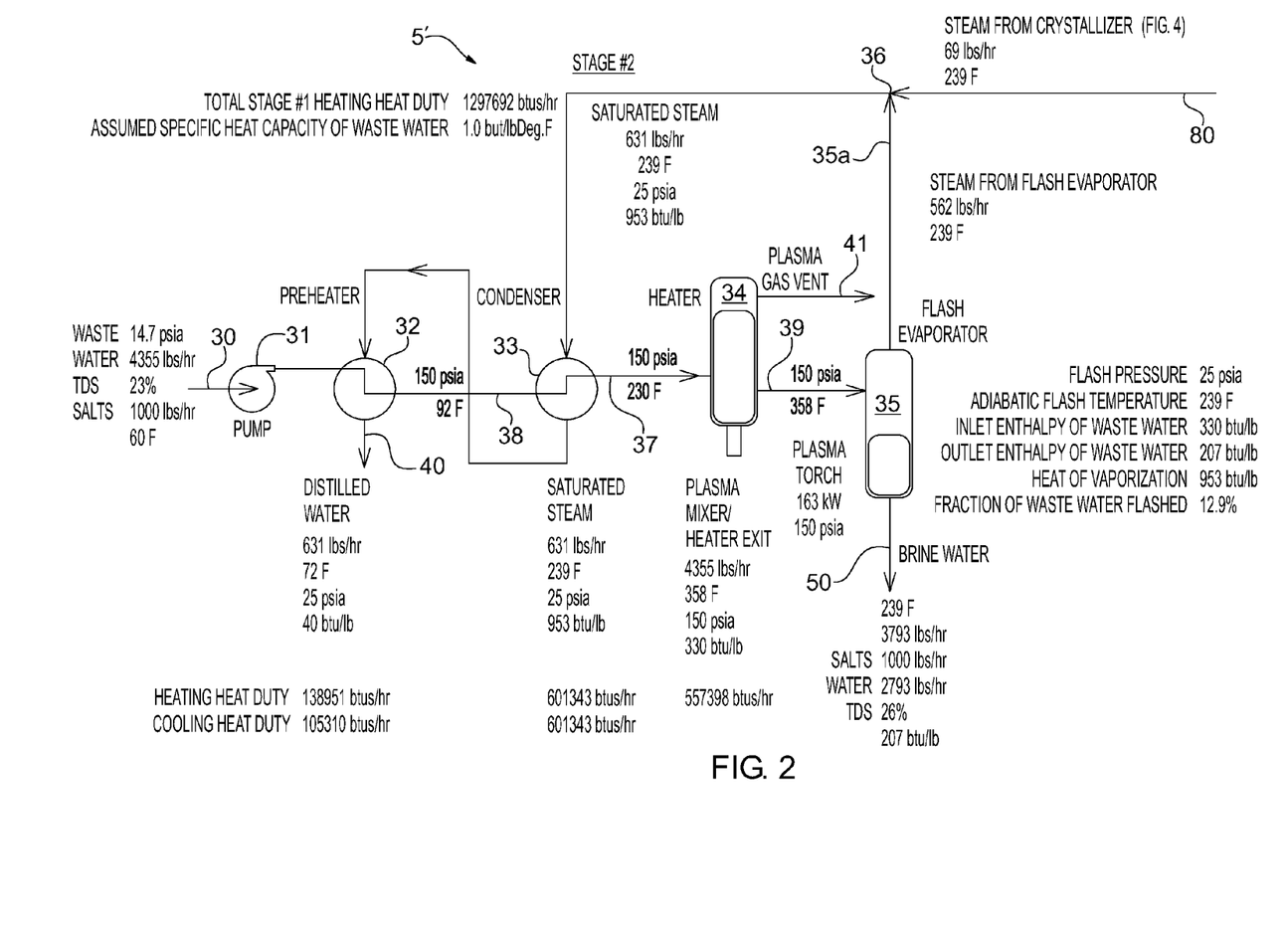
Figure 3:
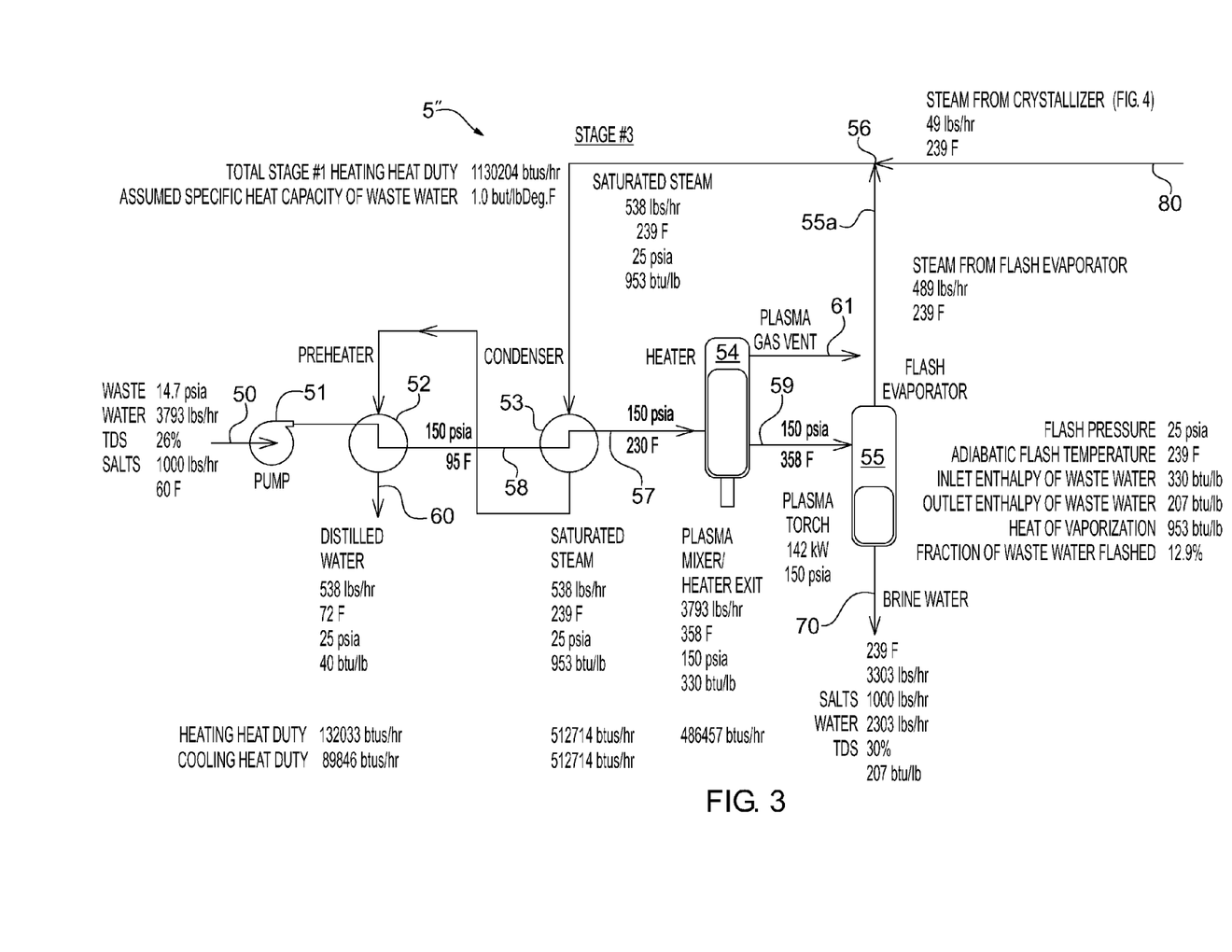

FIGS. 1, 2 and 3 will be individually discussed, but first their relation to each other in an example multi-stage system will be described. FIG. 1 shows Stage #1. This first stage, shown generally at 5, takes in waste water at an inlet 10, processes it, and produces first stage brine water at an outlet 30 of the first stage. The first stage brine water from the outlet 30 is then input to the second stage (Stage #2) shown in FIG. 2. The second stage, shown generally at 5', takes in the brine water 30, performs additional processing on it, and produces a resulting second stage brine water output at an outlet 50. Similarly, the brine water from outlet 50 of the second stage is supplied as an input to the third stage (Stage #3) shown in FIG. 3. The third stage, shown generally at 5", receives the brine water 50, performs further processing, and produces a resulting third stage output of brine water at an outlet 70.

It will be seen and appreciated by on skilled in the art how the successive stages of FIGS. 1, 2 and 3 increase the concentration of salts in the brine water (e.g., TDS). It will also be appreciated how the number of stages is a variable that can be chosen according to factors including, but not limited to, the salts content of the original waste water and the desired salt content after concentration. In general, a system in accordance with these exemplary embodiments may include any one or more stages such as are shown, for example, in FIGS. 1-3. The examples being presented are illustrative of systems and methods that may be chosen not merely for good technical performance but also for reasons relating to economic factors, such as, for example, initial capital cost and operating cost, as well as convenience factors, such as, for example, space requirements and portability. While three stages are shown and described herein, one skilled in the art will appreciate that any number of stages may be utilized depending on the particular application without departing from the spirit and scope of the present invention.

Each of the FIGS. 1-4, merely by way of further example and without limitation, are described in this specification and include legends, including numerical values (all of which are merely representative approximations and are not necessarily exact technical values and/or calculations). Further, these legends are not necessarily the only suitable values that represent the nature and characteristics of materials as applied to, affected by, and resulting from the operations of the exemplary system(s). Not all such legends will be repeated in this text, although all form a part of this disclosure and are believed understandable to persons of ordinary skill in water treatment and thermal processes. As appreciated by one skilled in the art, such data are sometimes referred to as heat and material balances. It is specifically to be understood and will be appreciated by one skilled in the art that the various values indicated in the legends may have a tolerance of ±20%, as they are representative approximations and not exact technical values.

Referring to FIG. 1, which is Stage #1, the waste water progresses from the input 10 to the output 30 successively through a pump 11, a preheater 12, a condenser 13, an additional heater 24, and a flash evaporator 15. An alternative is to have, in place of a single preheater 12, a series of preheaters or heat exchangers. The heating medium or source for the preheater(s) 12 can be excess steam available from a crystallizer 90 (see FIG. 4) and/or hot water available from the condenser 13.

The pump 11 pressurizes the waste water 10 and elevates the pressure from approximately 14.7 psia (1 atm) to approximately 150 psia. The level of pressurization of waste water in all Stages is such that there is no boiling of the waste water inside and across the heat exchanger surfaces of all heat exchanger used in this system. This is done to prevent formation of deposits (scales, fouling etc.) on the heat exchanger surfaces. The temperature of the waste water 10 is raised by the preheater 12 and the condenser 13 so the input waste water to the additional heater 24 at an inlet 17 is at approximately 150 psia and 230° F. In the embodiment show in FIG. 1, the preheater 12 heats the waste water from approximately 60° F. at the inlet 10 to approximately 89° F. at an inlet 18 to the condenser 13. The preheater 12 also outputs clean, distilled water at output 20 that is generally free from contaminants/impurities. The condenser 13 further heats the waste water to approximately 230° F. The heater 24 further heats the waste water to a temperature of approximately 358° F. at an inlet 19 to a flash evaporator 15.

Figure 4:
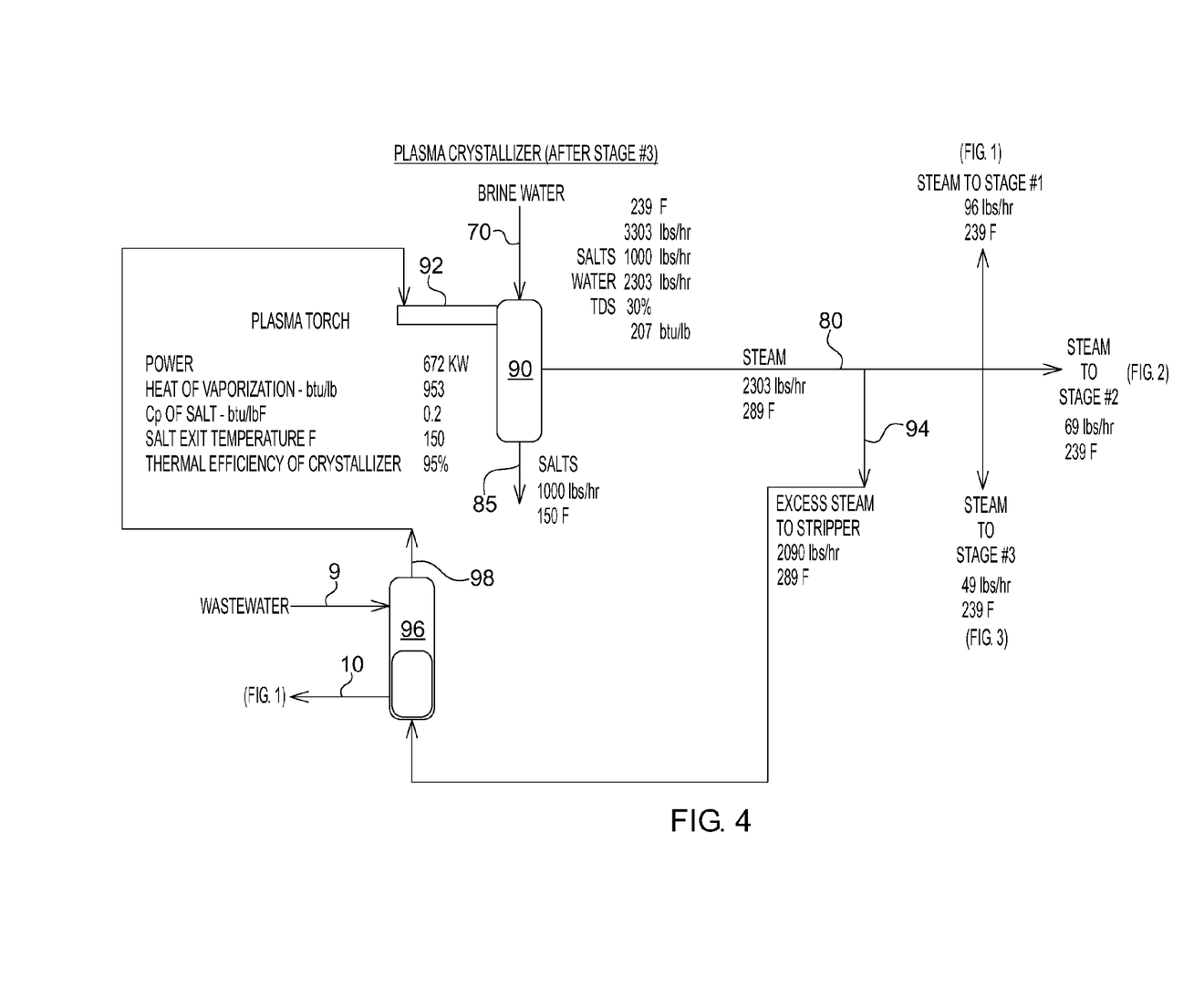
FIG. 4 is a schematic flow diagram of an exemplary thermal reactor for use in a water treatment system in conjunction with elements such as those show in FIGS. 1-3, in accordance with the present invention.

In the exemplary system, the initial elevation in temperature is due to the effect of saturated steam from a steam output 80 of the crystallizer subsystem 90 of FIG. 4, plus steam 15*a* from the flash evaporator 15 that joins with steam output 80 from the crystallizer 90 at a junction 16. The steam continues to the condenser 13 and the preheater 12, until it exits the preheater 12 as distilled water at outlet 20. Under certain operating conditions, the steam addition from the crystallizer 90 may be negative, i.e., steam is sent as excess to the crystallizer for other uses (e.g., as a heat source for the stripper 96).

The heating in the additional heater 24 is accomplished by a hot gas mixed with the waste water. The hot gas may be, for example, a plasma torch gas or gas heated by a natural gas burner. However, other types of hot gas heaters may be included without departing from the spirit and scope of the present invention. Additionally, the gas in the heater 24 can be chosen from a wide range of choices and it is subsequently vented from the system at vent 21. In one exemplary embodiment, air may be conveniently used as the heated gas.

The Stage #1 output 30 has the volume of waste water reduced from the input 10 with the salts more concentrated to approximately 23% TDS, which is increased from the initial approximately 20% TDS in the exemplary waste water at the input 10.

Stage #2 of the system as shown in FIG. 2 has elements substantially like those of Stage #1 as shown and described with respect to FIG. 1, but with some different operating parameters as shown in the legends in FIG. 2. Referring to FIG. 2, which is Stage #2, the brine water 30 from Stage #1 progresses to the output 50 successively through a pump 31, a preheater 32, a condenser 33, an additional heater 34, and a flash evaporator 35. An alternative is to have, in place of a single preheater 32, a series of preheaters or heat exchangers. The heating medium or source for the preheater(s) 32 can be excess steam available from a crystallizer 90 (see FIG. 4) and/or hot water available from the condenser 33.

The pump 31 pressurizes the brine water 30 and elevates the pressure from approximately 14.7 psia (1 atm) to approximately 150 psia. The temperature of the brine water 30 is also raised by the preheater 32 and the condenser 33 so the input brine water to the additional heater 34 at an inlet 37 is at approximately 150 psia and 230° F. In the embodiment show in FIG. 2, the preheater 32 heats the brine water from approximately 60° F. at the inlet 30 to approximately 92° F. at an inlet 38 to the condenser 33. The preheater 32 also outputs clean, distilled water at output 40 that is generally free from contaminants/impurities. The condenser 33 further heats the brine water to approximately 230° F. The heater 34 further heats the brine water to a temperature of approximately 358° F. at an inlet 39 to a flash evaporator 35.

In the exemplary system, the initial elevation in temperature is due to the effect of saturated steam from a steam output 80 of the crystallizer subsystem 90 of FIG. 4, plus steam 35a from the flash evaporator 35 that joins with steam output 80 from the crystallizer 90 at a junction 36. The steam continues to the condenser 33 and the preheater 32, until it exits the preheater 32 as distilled water at outlet 40. Under certain operating conditions, the steam addition from the crystallizer 90 may be negative, i.e., steam is sent as excess to the crystallizer for other uses (e.g., as a heat source for the stripper 96).

The heating in the additional heater 34 is accomplished by a hot gas mixed with the waste water. The hot gas may be, for example, a plasma torch gas or gas heated by a natural gas burner. However, other types of hot gas heaters may be included without departing from the spirit and scope of the present invention. Additionally, the gas in the heater 34 can be chosen from a wide range of choices and it is subsequently vented from the system at vent 41. In one exemplary embodiment, air may be conveniently used as the heated gas.

The Stage #2 output 50 has the volume of brine water reduced from its input 30 with the salts more concentrated to approximately 26% TDS, which is increased from the initial approximately 23% TDS in the exemplary brine water at its input 30.

Similarly, Stage #3 of FIG. 3 has elements substantially like those of Stage #2 as shown and described with respect to FIG. 2, but with still some differences in operating parameters as shown in the legends in FIG. 3. Referring to FIG. 3, which is Stage #3, the brine water 50 from Stage #2 progresses to the output 70 successively through a pump 51, a preheater 52, a condenser 53, an additional heater 54, and a flash evaporator 55. An alternative is to have, in place of a single preheater 52, a series of preheaters or heat exchangers. The heating medium or source for the preheater(s) 52 can be excess steam available from a crystallizer 90 (see FIG. 4) and/or hot water available from the condenser 53.

The pump 51 pressurizes the brine water 50 and elevates the pressure from approximately 14.7 psia (1 atm) to approximately 150 psia. The temperature of the brine water 50 is also raised by the preheater 52 and the condenser 53 so the input brine water to the additional heater 54 at an inlet 57 is at approximately 150 psia and 230° F. In the embodiment show in FIG. 3, the preheater 52 heats the brine water from approximately 60° F. at its inlet 50 to approximately 95° F. at an inlet 58 to the condenser 53. The preheater 52 also outputs clean, distilled water at output 60 that is generally free from contaminants/impurities. The condenser 53 further heats the brine water to approximately 230° F. The heater 54 further heats the brine water to a temperature of approximately 358° F. at an inlet 59 to a flash evaporator 55.

In the exemplary system, the initial elevation in temperature is due to the effect of saturated steam from a steam output 80 of the crystallizer subsystem 90 of FIG. 4, plus steam 55a from the flash evaporator 55 that joins with steam output 80 from the crystallizer 90 at a junction 56. The steam continues to the condenser 53 and the preheater 52, until it exits the preheater 52 as distilled water at outlet 60. Under certain operating conditions, the steam addition from the crystallizer 90 may be negative, i.e., steam is sent as excess to the crystallizer for other uses (e.g., as a heat source for the stripper 96).

The heating in the additional heater 54 is accomplished by a hot gas mixed with the waste water. The hot gas may be, for example, a plasma torch gas or gas heated by a natural gas burner. However, other types of hot gas heaters may be included without departing from the spirit and scope of the present invention. Additionally, the gas in the heater 54 can be chosen from a wide range of choices and it is subsequently vented from the system at vent 61. In one exemplary embodiment, air may be conveniently used as the heated gas.

The Stage #3 output 70 has the volume of brine water reduced from its input 50 with the salts more concentrated to approximately 30% TDS, which is increased from the initial approximately 26% TDS in the exemplary brine water at its input 50. In addition, the volume of water with the salts is reduced at the outlet 70 of Stage #3 by 54% from that at the inlet 10 of Stage #1.

The exemplary system includes multiple (three) concentration stages (FIGS. 1-3) that are substantially alike in the combination of equipment used. However, other exemplary systems with multiple concentration stages may have individual stages of more varied combinations of equipment without departing from the spirit and scope of the present invention.

The inputs and outputs of the individual stages can all be simply at 14.7 psia or at a pressure chosen by the process operator to optimize energy utilization within the process. Advantage can be taken within each stage to pressurize the inputs to the respective flash evaporators 15, 35, 55 to about 150 psia. The level of pressurization of waste water in all Stages is such that there is no boiling (nucleate or other type) of the waste water inside and across the heat exchanger surfaces of both the condensers, heaters and preheaters of each Stage. This prevents the formation of deposits (scales, fouling etc.) on the heat exchanger surfaces and reduces the requirement for cleaning of the heat exchangers. This results in the reduction of the operating cost. In this example, such an increase in pressure can result in a temperature of about 358° F. input to the flash evaporators 15, 35, 55 for quicker, more efficient separation and concentration in the respective flash evaporator 15, 35, 55.

FIG. 4 represents an exemplary embodiment of applying the output brine water (line 70) of the Stage #3 treatment (FIG. 3) to a plasma crystallizer 90. The plasma crystallizer 90 is an example of a known thermal reactor that can be used to finish separation of water from salts dissolved therein. One skilled in the relevant art will appreciate, however, that other thermal reactors may also be used without departing from the spirit and scope of the present invention. The example of a plasma reactor, which can be consistent with known plasma gasification/vitrification reactors, operated with one or more plasma torches 92, as is well-known in published literature, is believed to provide opportunity for a favorable cost-benefit ratio.

In general, for multistage operation, the plasma crystallizer 90 (or other reactor) is typically utilized after the final concentration stage when the output brine water has been concentrated to a desired level, as described in the above example. It can also be suitable to have a multistage system not only for salts concentration (as in FIGS. 1-3), but also a separation subsystem with a reactor (e.g., plasma crystallizer 90) after any individual one of the early concentration stages (e.g., after either, or both, of Stages #1 and #2). However, it is generally more cost effective to have a single separation subsystem after the last of determined number of concentration stages for the desired separation.

In general, any thermal reactor may be used to separate the salts and the water. A reactor operated to produce disposable salts (referred to herein as a "crystallizer") is generally suitable. Where the salts have toxicity, it may be desirable to operate the reactor in a manner so they are vitrified or made into glass. Accordingly, any reference to a crystallizer herein can also include a vitrifier.

As shown in FIG. 4, the crystallizer has a salts output at an outlet 85 that is generally equivalent to the total salts content of the original waste water. The water output of the total system is recovered as clean, distilled water from the preheaters 12, 32, 52 of the respective Stages of FIGS. 1-3, and/or may be recovered directly from steam exiting the crystallizer 90.

FIG. 4 shows the brine water 70 entering the crystallizer 90 without need for additional pressurization. FIG. 4 also shows how steam from the crystallizer 90 can be redirected back to the respective earlier Stages of FIGS. 1-3. The steam output from the crystallizer 90 at line 80 may be provided back to the various Stages #1, #2 and #3 and used for heating by the respective preheaters and condensers therein. Also, FIG. 4 shows an "Excess Steam to Stripper" of a certain amount at line 94. This steam 94 is used in a stripper 96 (which may be an additional flash evaporator) which is utilized to remove, for example, Volatile Organic Compounds ("VOCs") from the waste water before processing. Some excess steam from the crystallizer 90 may also be used for other purposes, e.g., to preheat the input waste water in a preheater or condenser.

Before treatment in the Stages shown in FIGS. 1-3, the incoming waste water 9 can be first, in this exemplary embodiment, sent to the stripper 96 where the steam 94 is used to remove VOCs from the waste water 9. Alternatively, the excess steam 94 may be used to preheat air in a separate heater first (not shown), and then the heated air can be used in the stripper 96. The stripped waste water 10 is sent as feed at the input 10 of Stage #1 (see FIG. 1). The VOCs which are removed from the waste water 9 exit the stripper 96 through a conduit 98 which connects to the plasma crystallizer 90. Additionally or alternatively, a condenser with a knock-out pot (not shown) can be used between the plasma crystallizer 90 and the stripper 96 with the condensed VOCs (as well as any stripped VOCs) fed directly to the plasma crystallizer 90. The VOCs are fed in front of the plasma torch 92 (e.g., along with brine water from Stage #3) such that they intensely mix with the high temperature gases exiting from the plasma torch 92. The plasma torch 92 is operated using appropriate gas (e.g., air, oxygen, hydrogen, etc.) that will aid in, or result in, the complete destruction of the VOCs. The VOCs are substantially converted to carbon dioxide and steam. The heat generated by this conversion of VOCs to carbon dioxide and steam is utilized in the plasma crystallizer 90, along with heat inputted through the plasma torch 92, to vaporize the water from the brine water 70. This reduces the amount of heat and the corresponding amount of electricity utilized in the plasma torch 92 of the plasma crystallizer 90, thus increasing its cost effectiveness.

The steam exiting the plasma crystallizer 90 can be, in this exemplary embodiment, periodically vented to the atmosphere (not shown) to help keep the levels of non-condensable gases low enough such that they do not degrade the performance of the heat exchangers used in the inventive system and process.

It is therefore seen that systems and processes in accordance with the present invention can make use of known and available components (such as, for example, flash evaporators for concentration of salts and plasma (or other) gasifier reactors for crystallization (or vitrification) of the salts) in particular innovative ways with insight as to both the capital cost and the operating cost. A need for such cost effective water treatment has been heightened by practices, such as, for example, the use of large amounts of water in natural gas drilling. However, the present invention may be used in any situation where impurities to be removed exist.

In general summary, but without limitation, the present invention can be characterized in the following ways, for example: A system, and a corresponding method, in which waste water is supplied to one or more stages of equipment including a pump for pressurizing the water (e.g., to about 150 psia), a preheater that heats the pressurized water (as well as removing distilled water) well above normal boiling temperature, and a condenser that effects further heating of the pressurized waste water. The system additionally has a heater after the condenser of each stage that raises the temperature even higher well above normal boiling temperature. That heater is operated with a hot gas developed by a plasma torch or a natural gas burner or other similar device. Then, the heated and pressurized waste water goes to a flash evaporator, or other device, that receives the heated, pressurized waste water and results in fluid evaporation and concentration of solids that were in the waste water. In, for example, instances in which the waste (brine) water with concentrated solids cannot be otherwise readily and safely disposed of, a thermal or pyrolytic reactor is provided to crystallize or otherwise yield a form of the solids that can be readily and safely disposed of. In one form, such a reactor may also be applied as a heater for the original incoming waste water. Also, or alternatively, such a reactor may be used to form a vitrified glass of the salts output of any water treatment system that produces a brine water.

It will be apparent to those skilled in the art that numerous modifications and variations of the described examples and embodiments are possible in light of the above teachings of the disclosure. The disclosed examples and embodiments are presented for purposes of illustration only. Other alternate embodiments may include some or all of the features disclosed herein. Therefore, it is the intent to cover all such modifications and alternate embodiments as may come within the true scope of this invention, which is to be given the full breadth thereof. Additionally, the disclosure of a range of values is a disclosure of every numerical value within that range.

I claim:

1. A method of treating waste water comprising the steps of:
   (a) receiving waste water at a first pressure between 11.8-17.6 psia and a first temperature between 48-72° F., the waste water comprising dissolved solids and volatile organic compounds;
   (b) pressurizing the received waste water to a second pressure between 120-180 psia, the second pressure greater than the first pressure;
   (c) preheating the pressurized waste water to a second temperature between 71-114° F., the second temperature greater than the first temperature, wherein said preheating step produces a distilled water and a pressurized/preheated waste water without boiling of the waste water across heat transfer surfaces;
(d) heating the pressurized/preheated waste water to a third temperature between 184-276° F., the third temperature greater than the second temperature, to produce a pressurized/heated waste water without boiling of the waste water across heat transfer surfaces;
(e) further heating the pressurized/heated water with a heater operated with a hot gas developed by a plasma torch or a natural gas burner to a fourth temperature between 286-430° F., the fourth temperature greater than the third temperature, to produce a second pressurized/heated waste water without boiling of the waste water across heat transfer surfaces;
(f) evaporating the second pressurized/heated waste water in an evaporator to remove dissolved solids by evaporation caused by depressurization of the waste water to produce a first steam and a brine water, wherein the brine water has a total dissolved solids content greater than a total dissolved solids content of the received waste water; and
(g) crystallizing the brine water to produce a solid mass of waste product and a second steam,
where step (g) uses a plasma torch to crystallize the brine water.

2. The method of claim 1, wherein the first steam produced in step (f) is used as a heat source in at least one of steps (c) and (d).

3. The method of claim 1, wherein steps (a)-(f) comprise a stage, and wherein the method is performed in multiple stages operated in series with the brine water output by step (f) in one stage used as the received waste water in step (a) of a next stage.

4. The method of claim 3, wherein the brine water output in step (f) of each stage has a total dissolved solids content that is higher than that of a previous stage.

5. The method of claim 1, wherein the second steam produced by step (g) is used as a heat source in at least one of steps (c) and (d).

6. The method of claim 1, further comprising the steps of:
(b') prior to step (b), removing the volatile organic compounds from the received waste water, wherein the removed volatile organic compounds are used as a fuel by the plasma torch to crystallize the brine water.

7. The method of claim 6, wherein the second steam produced by step (g) is used as a heat source in step (b').

8. The method of claim 1, wherein step (g) produces a vitrified glass of the salts in the brine water as the solid mass of waste product.

9. The method of claim 1, wherein the heater used in step (e) has a plasma power input appropriately adjusted to produce the heating of the pressurized waste water by direct contact of the hot plasma gas and the waste water.

10. A system for treating waste water comprising:
a pump receiving waste water at a first pressure between 11.8-17.6 psia and a first temperature between 48-72° F. and pressurizing the received waste water to a second pressure between 120-180 psia, the second pressure greater than the first pressure, the waste water comprising dissolved solids and volatile organic compounds;
a preheater operatively connected to the pump and preheating the pressurized waste water to a second temperature between 71-114° F., the second temperature greater than the first temperature, wherein said preheating step produces a distilled water and a pressurized/preheated waste water without boiling of the waste water across heat transfer surfaces;
a condenser operatively connected to the preheater and heating the pressurized/preheated waste water to a third temperature between 184-276° F., the third temperature greater than the second temperature, to produce a pressurized/heated waste water without boiling of the waste water across heat transfer surfaces;
a heater operatively connected to the condenser and operated with a hot gas developed by a plasma torch or a natural gas burner further heating the pressurized/heated water to a fourth temperature between 286-430° F., the fourth temperature greater than the third temperature, to produce a second pressurized/heated waste water without boiling of the waste water across heat transfer surfaces;
an evaporator operatively connected to the heater and removing dissolved solids from the second pressurized/heated waste water by evaporation caused by depressurization of the waste water to produce a first steam and a brine water, wherein the brine water has a total dissolved solids content greater than a total dissolved solids content of the received waste water; and
a crystallizer crystallizing the brine water to produce a solid mass of waste product and a second steam,
wherein the crystallizer comprises a plasma crystallizer and includes a plasma torch for vaporizing the water from the brine water and producing the solid mass of waste product and steam.

11. The system of claim 10, wherein the first steam produced by the evaporator comprises distilled water.

12. The system of claim 10, wherein the first steam produced by the evaporator is used as a heat source by at least one of the preheater and the condenser.

13. The system of claim 10, wherein the pump, preheater, condenser, heater and evaporator comprise a stage, and wherein the system comprises multiple stages operated in series with the brine water output by one stage used as the received waste water of a next stage.

14. The system of claim 13, wherein the brine water output by each stage has a total dissolved solids content that is higher than that of a previous stage.

15. The system of claim 10, wherein the second steam produced by the crystallizer is used as a heat source by at least one of the preheater and condenser.

16. The system of claim 10, further comprising a stripper initially receiving the waste water and removing the volatile organic compounds from the waste water prior to the waste water being pressurized by the pump, wherein the removed volatile organic compounds are used as a fuel by the plasma torch to crystallize the brine water.

17. The system of claim 16, where the second steam produced by the crystallizer is used as a heat source by the stripper.

18. The system of claim 10, wherein the sold mass of waste product comprises a vitrified glass of the salts in the brine water.

19. The system of claim 10, wherein the heater has a plasma power input appropriately adjusted to produce the heating of the pressurized waste water by direct contact of the hot plasma gas and the waste water.

* * * * *

UNITED STATES PATENT AND TRADEMARK OFFICE
CERTIFICATE OF CORRECTION

PATENT NO. : 9,527,005 B2
APPLICATION NO. : 13/613478
DATED : December 27, 2016
INVENTOR(S) : Shyam V. Dighe Page 1 of 1

It is certified that error appears in the above-identified patent and that said Letters Patent is hereby corrected as shown below:

In the Claims

In Column 12, Line 58, change "sold" to --solid--.

Signed and Sealed this
Fourteenth Day of March, 2017

Michelle K. Lee
*Director of the United States Patent and Trademark Office*